United States Patent
McLees et al.

(10) Patent No.: US 10,089,892 B2
(45) Date of Patent: Oct. 2, 2018

(54) FLIGHT CONTROL SYSTEM WITH LOW-FREQUENCY INSTRUMENT LANDING SYSTEM LOCALIZER ANOMALY DETECTION AND METHOD OF USE

(71) Applicant: THE BOEING COMPANY, Chicago, IL (US)

(72) Inventors: Robert E. McLees, Kirkland, WA (US); Andrew R. Hooks, Edmonds, WA (US); Prachya Panyakeow, Seattle, WA (US)

(73) Assignee: THE BOEING COMPANY, Chicago, IL (US)

( * ) Notice: Subject to any disclaimer, the term of this patent is extended or adjusted under 35 U.S.C. 154(b) by 164 days.

(21) Appl. No.: 15/340,371

(22) Filed: Nov. 1, 2016

(65) Prior Publication Data
US 2018/0122248 A1    May 3, 2018

(51) Int. Cl.
*G06F 19/00*    (2018.01)
*G06G 7/70*    (2006.01)
(Continued)

(52) U.S. Cl.
CPC ........... *G08G 5/025* (2013.01); *G05D 1/0202* (2013.01); *B64D 45/04* (2013.01); *G05D 1/0676* (2013.01); *G08G 5/02* (2013.01)

(58) Field of Classification Search
CPC ........ G08G 5/025; G08G 5/02; G05D 1/0202; G05D 1/0676; B64D 45/04
See application file for complete search history.

(56) References Cited

U.S. PATENT DOCUMENTS

| | | |
|---|---|---|
| 3,818,476 A | 6/1974 | Coulter et al. |
| 4,311,466 A | 1/1982 | Carpenter et al. |
| (Continued) | | |

FOREIGN PATENT DOCUMENTS

| | | |
|---|---|---|
| EP | 0315227 A2 | 5/1989 |
| EP | 2511733 A2 | 10/2012 |
| EP | 2765389 A1 | 8/2014 |

OTHER PUBLICATIONS

Extended European Search Report for Application No. 17190618.3, dated Feb. 23, 2018, 9 pages.
(Continued)

*Primary Examiner* — Rachid Bendidi
(74) *Attorney, Agent, or Firm* — Armstrong Teasdale LLP

(57) ABSTRACT

A flight control module for detecting anomalies in ILS localizer signals during landing of an aircraft is provided. The flight control module includes a communication interface and a processor coupled thereto. The communication interface is configured to receive inertial data, GPS data, and an ILS localizer deviation for the aircraft. The processor is configured to compute an inertial localizer deviation based on the inertial data and a GPS localizer deviation based on the GPS data. The processor is configured to compare the ILS localizer deviation to an average of the inertial localizer deviation and the GPS localizer deviation to detect a low-frequency anomaly in the ILS localizer deviation. The processor is configured to initiate a transition from controlling the aircraft based on the ILS localizer deviation to controlling the aircraft based on the inertial localizer deviation when the low-frequency anomaly is detected.

24 Claims, 6 Drawing Sheets

(51) Int. Cl.
  *G08G 5/02* (2006.01)
  *G05D 1/02* (2006.01)
  *B64D 45/04* (2006.01)
  *G05D 1/06* (2006.01)

(56) References Cited

U.S. PATENT DOCUMENTS

| | | |
|---|---|---|
| 3,041,607 A | 6/1982 | Rhodes et al. |
| 4,399,425 A | 8/1983 | Taylor |
| 4,429,312 A | 1/1984 | Chisholm |
| 4,534,000 A | 8/1985 | Bliss |
| 4,567,483 A | 1/1986 | Bateman et al. |
| 4,680,587 A | 7/1987 | Chisholm |
| 4,916,612 A | 4/1990 | Chin et al. |
| 5,387,863 A | 2/1995 | Lo et al. |
| 5,523,949 A | 6/1996 | Agate et al. |
| 5,745,054 A | 4/1998 | Wilkens |
| 5,786,773 A | 7/1998 | Murphy |
| 6,178,363 B1 | 1/2001 | McIntyre et al. |
| 6,606,545 B1 | 8/2003 | McCall et al. |
| 7,546,183 B1 | 6/2009 | Marcum |
| 7,619,556 B1 | 11/2009 | McCusker |
| 7,917,254 B2 | 3/2011 | Krough |
| 7,941,251 B2 | 5/2011 | Krough et al. |
| 8,035,547 B1 | 10/2011 | Flanigan et al. |
| 8,160,758 B2 | 4/2012 | Call et al. |
| 8,630,756 B2 | 1/2014 | Fleiger-Holmes et al. |
| 8,698,655 B2 | 4/2014 | Flanigan et al. |
| 8,798,820 B2 | 8/2014 | Hooks |
| 9,098,999 B2 | 8/2015 | Snow et al. |
| 9,257,050 B2 | 2/2016 | Fleiger-Holmes et al. |
| 2007/0020588 A1 | 1/2007 | Batcheller et al. |
| 2009/0069960 A1* | 3/2009 | Lapp .............. G05D 1/0077 701/16 |
| 2010/0017053 A1* | 1/2010 | Krogh .............. G08G 5/0013 701/17 |
| 2012/0265376 A1* | 10/2012 | Fleiger-Holmes ........ G01S 1/18 701/16 |
| 2013/0041529 A1* | 2/2013 | He .............. G08G 5/0021 701/17 |
| 2013/0289802 A1 | 10/2013 | Beaufrere |
| 2014/0229039 A1* | 8/2014 | Murphy .............. G01C 21/165 701/17 |
| 2014/0288733 A1* | 9/2014 | He .............. G01C 21/005 701/17 |
| 2016/0012735 A1* | 1/2016 | Koukol .............. G01S 19/15 701/17 |

OTHER PUBLICATIONS

Extended European Search Report for Application No. 17190626.6, dated May 28, 2018; 7 pages.

\* cited by examiner

FLIGHT CONTROL SYSTEM WITH LOW-FREQUENCY INSTRUMENT LANDING SYSTEM LOCALIZER ANOMALY DETECTION AND METHOD OF USE

BACKGROUND

The field of the disclosure relates generally to flight control systems and, more specifically, to a flight control module utilizing a synthetic inertial localizer deviation for detecting low-frequency instrument landing system (ILS) localizer anomalies.

Many known aircraft feature an automated landing system that controls the aircraft during landing. Automated landing systems have become increasingly more common and are frequently relied on for both instrument landings under instrument flight rules (IFR) and landings performed under visual flight rules (VFR). Known automated landing systems utilize various receivers, such as multi-mode receivers (MMRs), for example, to receive guidance signals transmitted from the ground. Such guidance signals may include, for example, ILS signals, global positioning service (GPS) landing system (GLS) signals, and/or microwave landing system (MLS) signals. The guidance signals inform the aircraft of its position relative to a desired vertical and lateral path to the runway and through roll-out after touchdown. The desired vertical path is referred to as the glideslope and the lateral path is referred to as the localizer. The glideslope is typically defined as a 3° descent with a desired intercept with the ground at 1000 feet beyond the runway threshold. The localizer guides the aircraft to the runway centerline.

The guidance signals transmitted from the ground are received by an on-board antenna and routed to redundant MMRs. Each MMR computes a localizer deviation and a glideslope deviation that are routed to a flight control module that includes the automated landing system. The localizer deviation is an indication of the aircraft's position relative to the desired path to the runway centerline. For example, the localizer deviation may indicate the aircraft is approximately 2° left of the runway centerline. The glideslope deviation is an indication of the aircraft's position relative to the desired glideslope to the runway. For example, the glideslope deviation may indicate the aircraft is 1° below the desired glideslope. The flight control module uses the localizer deviation and the glideslope deviation to command the automated landing system and to command control surfaces of the aircraft.

Under IFR conditions, the runway is typically kept clear of potential disruptions in the localizer signals transmitted from the ground. This is sometimes referred to as protecting the critical area. For example, taxiing aircraft and ground equipment are steered clear of the runway while a landing aircraft is on approach. Similarly, airborne aircraft are prohibited from flying across the airfield. In these situations, the throughput of the runway and surrounding airfield is reduced. Under VFR conditions, restrictions on operation of the runway and surrounding airfield are more relaxed, i.e., the critical area is not protected, allowing the runway and surrounding airfield to operate with greater throughput. More frequent use of automated landing systems under VFR conditions increases the likelihood of disruptions in the localizer signals transmitted from the ground. Such disruptions are referred to as anomalies in the localizer signals. Anomalies may result in drifting of the localizer input to automated landing systems, which may further result in misguiding the aircraft during landing and ultimately transitioning from automated landing to a manual landing.

BRIEF DESCRIPTION

According to one aspect of the present disclosure, a flight control module for detecting anomalies in instrument landing system (ILS) localizer signals during landing of an aircraft is provided. The flight control module includes a communication interface and a processor coupled thereto. The communication interface is configured to receive inertial data, global position system (GPS) data, and an ILS localizer deviation for the aircraft. The processor is configured to compute an inertial localizer deviation based on the inertial data and a GPS localizer deviation based on the GPS data. The processor is configured to compare the ILS localizer deviation to an average of the inertial localizer deviation and the GPS localizer deviation so as to detect a low-frequency anomaly in the ILS localizer deviation. The processor is configured to initiate a transition from controlling the aircraft based on the ILS localizer deviation to controlling the aircraft based on the inertial localizer deviation when the low-frequency anomaly is detected.

According to another aspect of the present disclosure, a flight control system for landing an aircraft is provided. The flight control system includes a communication bus, a GPS system, a multi-mode receiver (MMR), and a flight control module. The communication bus is coupled to the GPS system, the MMR, and the flight control module. The GPS system is configured to transmit a GPS position of the aircraft onto the communication bus. The MMR is configured to transmit an ILS localizer deviation onto the communication bus. The ILS localizer deviation is generated according to received ILS localizer signals. The flight control module is configured to receive inertial data for the aircraft, the GPS position, and the ILS localizer deviation on the communication bus. The flight control module is further configured to compute a GPS localizer deviation and an inertial localizer deviation. The flight control module is further configured to detect a low-frequency anomaly in the received ILS localizer signals based on variances in the ILS localizer deviation relative to an average localizer deviation computed for the GPS localizer deviation and the inertial localizer deviation.

According to yet another aspect of the present disclosure, a method of detecting a low-frequency anomaly in an instrument landing system (ILS) localizer signal received by an aircraft during landing is provided. The method includes receiving an ILS localizer signal. The method includes computing an ILS localizer deviation based on the ILS localizer signal. The method includes controlling the aircraft according to the ILS localizer deviation. The method includes computing a GPS localizer deviation. The method includes computing an inertial localizer deviation. The method includes computing an average localizer deviation of the GPS localizer deviation and the inertial localizer deviation. The method includes detecting the low-frequency anomaly when a difference between the average localizer deviation and the ILS localizer deviation exceeds a threshold. The method includes controlling the aircraft according to the inertial localizer deviation after detecting the low-frequency anomaly.

The features, functions, and advantages that have been discussed can be achieved independently in various embodiments or may be combined in yet other embodiments further details of which can be seen with reference to the following description and drawings.

DETAILED DESCRIPTION

As used herein, an element or step recited in the singular and proceeded with the word "a" or "an" should be understood as not excluding plural elements or steps unless such exclusion is explicitly recited. Furthermore, references to "one embodiment" of the present invention or the "exemplary embodiment" are not intended to be interpreted as excluding the existence of additional embodiments that also incorporate the recited features.

Figure 1:
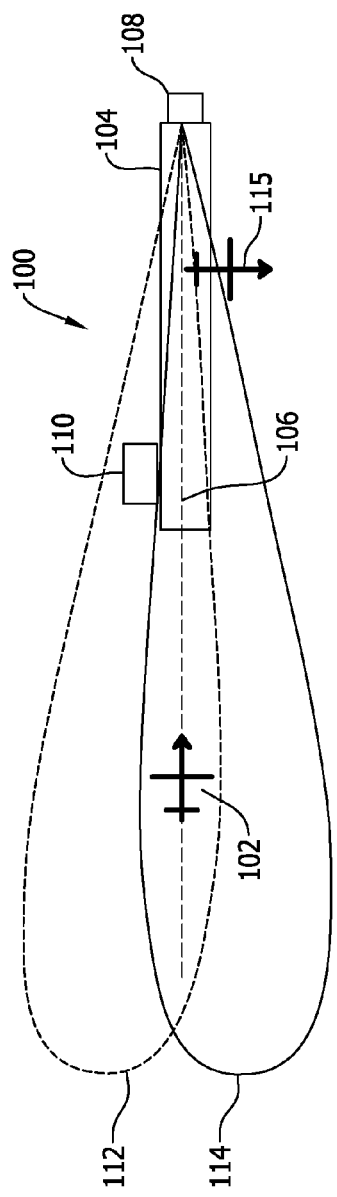
FIG. 1 is a top perspective diagram of an exemplary instrument landing system (ILS) for use in landing an aircraft.
Figure 2:
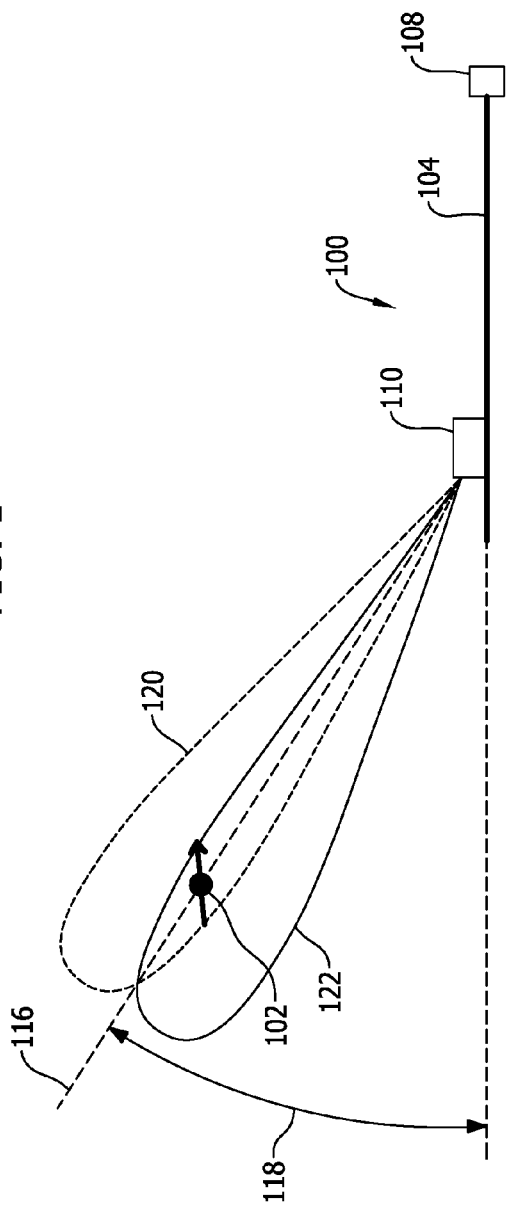
FIG. 2 is a side perspective diagram of the exemplary ILS shown in FIG. 1.

FIG. 1 is a perspective diagram, from a top-view, of an exemplary instrument landing system (ILS) 100 for use in landing an aircraft 102. FIG. 2 is another perspective diagram, from a side view, of ILS 100. Aircraft 102 is illustrated during approach for landing on a runway 104. Runway 104 is characterized by a runway centerline 106 that extends towards and beyond aircraft 102 for illustrative purposes.

Referring to FIG. 1, in the exemplary embodiment, ILS 100 includes a localizer transmitter 108 and a glideslope transmitter 110. Localizer transmitter 108 transmits a first localizer beam 112 and a second localizer beam 114 towards aircraft 102. First localizer beam 112 and second localizer beam 114 cooperate to define an ILS localizer signal that is received by aircraft 102 and processed to generate localizer deviations indicative of the lateral position of aircraft 102 relative to runway centerline 106. The localizer signals are typically used to control aircraft 102 through landing and rollout, i.e., deceleration along runway prior to taxi.

Under certain circumstances, another aircraft 115 or ground equipment (not shown) may travel through the path of first localizer beam 112 or second localizer beam 114 while aircraft 102 is on approach. Such activity may disrupt first localizer beam 112 or second localizer beam 114, introducing multi-path effects in the ILS localizer signals that are received by aircraft 102. The multi-path effects typically manifest as low-frequency oscillations or high-frequency oscillations in the ILS localizer deviations. High-frequency oscillations typically result from an airborne aircraft or other fast moving object moving quickly through first localizer beam 112 or second localizer beam 114. Such oscillations typically have a period of 1 second or fewer, i.e., one Hertz or greater. Some known systems for aircraft 102 are configured to detect these high-frequency anomalies in the ILS localizer signals. Low-frequency oscillations typically result from slow moving vehicles on the ground, such as, for example, taxiing aircraft and ground equipment. Such oscillations typically have a period greater than 1 second, i.e., below one Hertz.

Referring to FIG. 2, aircraft 102 approaches runway 104 along a predefined glideslope 116 that intercepts runway 104 at a predefined distance beyond a runway threshold for runway 104. The predefined distance is typically, for example, at least 1000 feet from the runway threshold, which is typically the site of glideslope transmitter 110. Glideslope 116 is defined by a glideslope angle 118 measured between glideslope 116 and runway 104. A typical glideslope, for example, is defined by glideslope angle 118 being equal to approximately 3°. Glideslope transmitter 110 transmits a first glideslope beam 120 and a second glideslope beam 122 towards aircraft 102. First glideslope beam 120 and second glideslope beam 122 define an ILS glideslope signal that is received by aircraft 102 and that is processed to generate glideslope deviations indicative of the vertical position of aircraft 102 relative to glideslope 116. The glideslope signals are typically used to control aircraft 102 until it reaches a flare altitude, i.e., an altitude when the nose of aircraft 102 pitches up prior to landing, which typically occurs between 50 and 75 feet. When the flare altitude is reached, aircraft 102 typically switches to a radio altimeter to guide aircraft 102 to runway 104 for landing. In alternative embodiments, flare altitude may be greater than 75 feet or, in some embodiments, below 50 feet.

Figure 3:
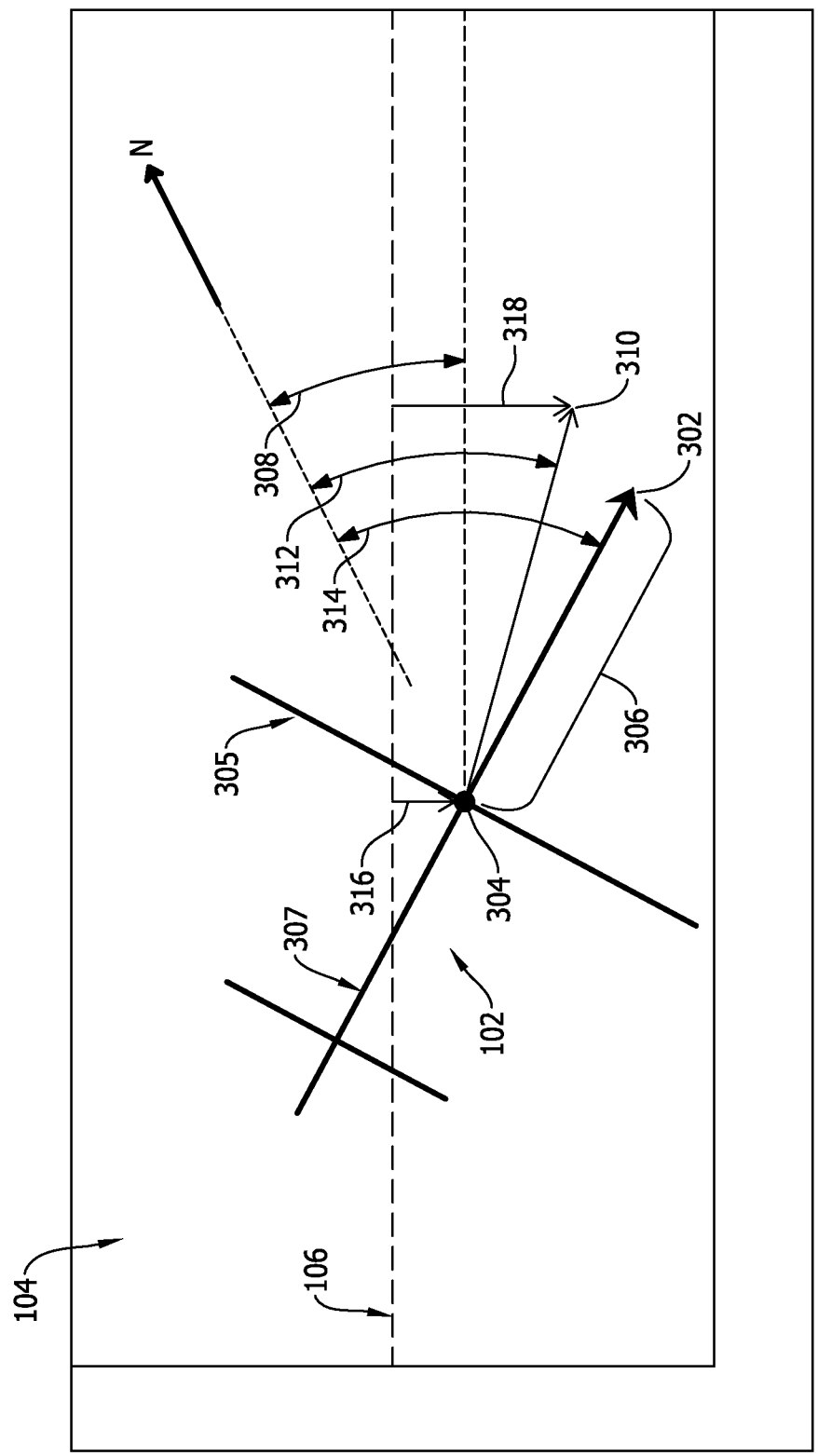
FIG. 3 is a top perspective diagram of the aircraft shown in FIGS. 1 and 2 during landing.

FIG. 3 is a perspective diagram of aircraft 102 during landing. FIG. 3 illustrates a top-view of aircraft 102 landing on runway 104. Aircraft 102 includes a guidance control point (GCP) 302 to which all flight control commands for aircraft 102 are referenced. GCP 302 is typically located at the nose of aircraft 102. Aircraft 102 also includes an inertial reference unit (IRU) 304 that includes various sensors for detecting linear and angular accelerations of aircraft 102, which are translatable to accelerations, velocities, and attitude of aircraft 102 along three axis, i.e., pitch, roll, and yaw. IRU 304 is typically located at or near the center of aircraft 102, which is illustrated in FIG. 3 as the intersection of the wings 305 and fuselage 307 of aircraft 102. Accordingly, GCP 302 and IRU 304 are typically separated by a distance 306 extending along a portion of the length of fuselage 307 of aircraft 102.

Runway 104 includes runway centerline 106 characterized by a runway heading 308 relative to magnetic North (N). Runway heading 308 is generally known by aircraft 102 and its navigations systems, and is sometimes referred to as a magnetic runway heading. During landing, aircraft 102 travels at a ground speed 310 along a track angle, or simply track 312, relative to North. Ground speed 310 and track 312 are measurable by IRU 304. Moreover, aircraft 102 travels with an aircraft heading 314 relative to North, which is generally defined as the direction the nose of aircraft 102 is pointing. Aircraft heading 314 is also measurable by IRU 304. Notably, under certain circumstances, such as crosswinds, for example, track 312 and aircraft heading 314 may be different.

FIG. 3 illustrates aircraft 102 at an orientation with a localizer deviation 316 measured from runway centerline 106 to IRU 304. Given inertial accelerations measured by IRU 304 and runway heading 308, aircraft 102 may compute an inertial cross-runway velocity 318 that, over time, increases or decreases localizer deviation 316 and that can be translated to GCP 302.

Figure 4:
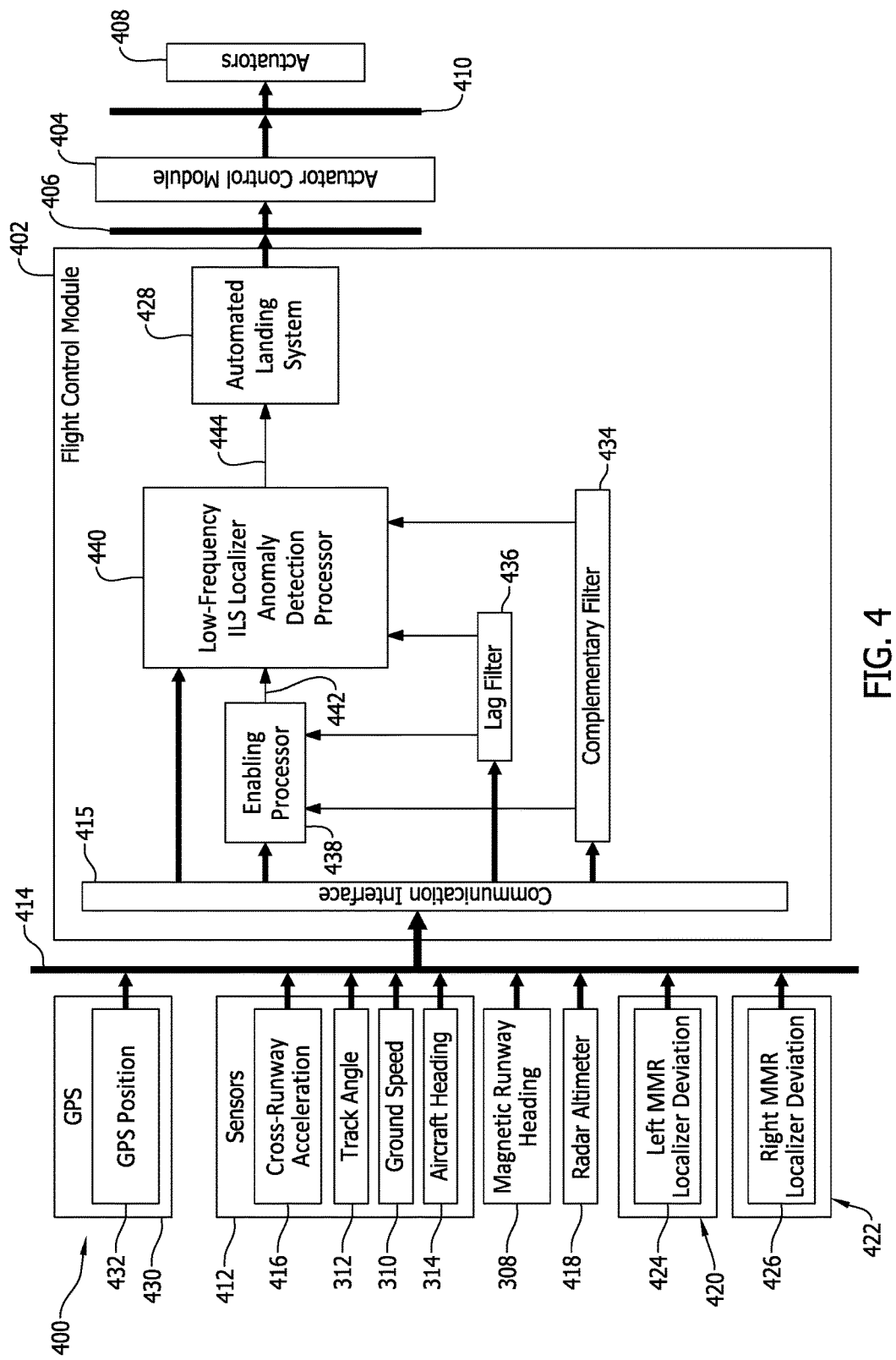
FIG. 4 is block diagram of an exemplary flight control system for the aircraft shown in FIGS. 1-3.

FIG. 4 is block diagram of an exemplary flight control system 400 for aircraft 102, shown in FIGS. 1-3. Flight control system 400 includes a flight control module 402 that controls aircraft 102 by transmitting commands to an actuator control module 404. Flight control module 402 communicates with actuator control module 404 over a communication bus 406. Actuator control module 404 controls one or more actuators 408 that are attached to various flight control surfaces of aircraft 102. Actuator control module 404 communicates with actuators 408 over a communication bus 410.

Aircraft 102 includes various sensors 412 that measure flight parameters and generate data that is transmitted onto a communication bus 414. Flight control module 402 is communicably coupled to communication bus 414 through communication interface 415 and gains access to the data.

Sensors 412 include various accelerometers and gyroscopes located at IRU 304 that provide cross-runway acceleration 416, ground speed 310, track angle 312, and aircraft heading 314. Communication bus 414 is configured to be coupled to IRU 304, which provides the inertial data. Communication bus 414 is further coupled to various other data sources, such as a navigation system (not shown) that provides runway heading 308 and a radar altimeter 418 that provides altitude above ground level for aircraft 102. In alternative embodiments, other measurements of altitude may be utilized and may be available on aircraft 102, such as, for example, barometric altitude or GPS ellipsoid altitude; however, altitude above ground level is most relevant to landing aircraft 102. Communication bus 414 is further coupled to a left MMR 420 and a right MMR 422. Left MMR 420 provides a left MMR localizer deviation 424. Right MMR 422 provides a right MMR localizer deviation 426. Communication bus 414 is further coupled to a GPS 430 that provides a GPS position 432 for aircraft 102.

Communication interface 415 receives first and second localizer deviation signals indicative of respective localizer deviations, such as left MMR localizer deviation 424 and right MMR deviation 426, computed based on the localizer transmission received by aircraft 102.

Communication interface 415 is further configured to receive GPS position 432 over communication bus 414. GPS position 432 is typically expressed as a latitude and longitude.

Flight control module 402 gains access to MMR localizer deviations 424 and 426 on communication bus 414 through communication interface 415, which may include an ARINC-429 interface circuit card configured to communicate within flight control module 402 using peripheral component interconnect (PCI), PCI Express, PC/104, Ethernet, compact PCI, or other suitable protocol.

Flight control module 402 includes an automated landing system 428. Flight control module 402 receives and processes data from communication bus 414 to detect low-frequency ILS anomalies in ILS localizer signals. Flight control module 402 includes a complementary filter 434 and a lag filter 436 for filtering MMR localizer deviations 424 and 426. Flight control module 402 includes an enabling processor 438 that enables or disables a low-frequency ILS localizer anomaly detection processor 440 based on inertial data, MMR localizer deviations 424 and 426, and GPS position 430.

Enabling processor 438 operates, for example, when aircraft 102 is between altitudes of 600 feet and 200 feet. In the event a low-frequency ILS anomaly exists as aircraft 102 descends through 200 feet, enabling processor 438 prevents low-frequency ILS localizer anomaly detection processor 440 from engaging and synchronizing to the anomaly. Enabling processor 438 generates a disable signal 442 that controls whether low-frequency ILS localizer anomaly detection processor 440 will engage when aircraft 102 descends below, for example, 200 feet.

Low-frequency ILS localizer anomaly detection processor 440 detects anomalies based on inertial data, MMR localizer deviations 424 and 426, and GPS position 430.

Low-frequency ILS localizer anomaly detection processor 440 generates an anomaly detected signal 444 that is used by flight control module 402 and automated landing system 428 to control aircraft 102. For example, when an anomaly is detected in MMR localizer deviations 424 or 426, automated landing system 428 transitions from control based on MMR localizer deviations 424 and 426 to control based on an inertial localizer deviation.

Figure 5:
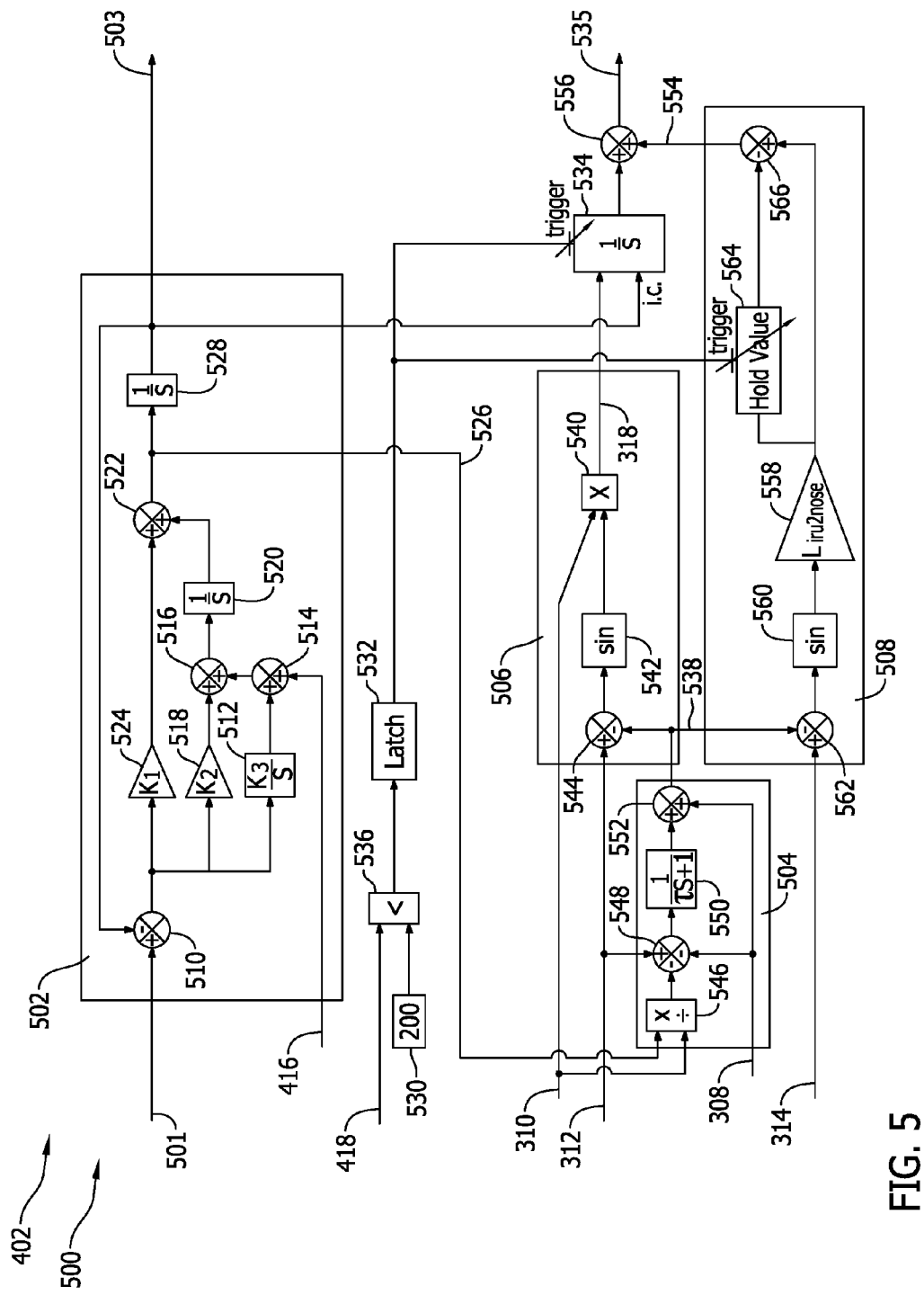
FIG. 5 is a functional block diagram of an exemplary flight control module for use in the flight control system shown in FIG. 4.

FIG. 5 is a functional block diagram of flight control module 402 and, more specifically, a synthetic inertial localizer deviation (SILD) processor 500. SILD processor 500 includes a complementary filter 502, a runway heading correction block 504, an inertial cross-runway velocity block 506, and a translation-to-GCP block 508.

Complementary filter 502 blends high-frequency content of inertial data from IRU 304 with low-frequency content of an ILS localizer deviation 501, such as MMR localizer deviations 424 and 426, to produce a smooth, complementary-filtered localizer deviation 503. Complementary-filtered localizer deviation 503 is fed back and subtracted 510 from ILS localizer deviation 501 to produce a localizer deviation error value. The localizer deviation error value is gained by $K_3$ and integrated 512. The result of integration 512 is added 514 to cross-runway acceleration 416, and then added 516 to the localizer deviation error value gained 518 by $K_2$. The result of summing 516 is integrated 520 and added 522 to the localizer deviation error value gained 524 by $K_1$. The result of summation 522 is a localizer deviation rate 526 that is integrated 528 to generate complementary-filtered localizer deviation 503. Complementary filter 502 is further characterized by, but not limited to the following equation, where $D_{CF}$ is complementary-filtered localizer deviation 503 as a function of time, t, and expressed in radians, $D_{sel}$ is ILS localizer deviation 501 as a function of time, t, and expressed in radians, and $A_{CR}$ is cross-runway acceleration 416 as a function of time, t.

$$D_{CF} = \left[ \frac{K_1 S^2 + K_2 S + K_3}{S^3 + K_1 S^2 + K_2 S + K_3} \right] \times D_{sel} + \left[ \frac{S}{S^3 + K_1 S^2 + K_2 S + K_3} \right] \times A_{CR} \qquad \text{EQ. 1}$$

When aircraft 102 descends, as measured by radar altimeter 418, below an altitude threshold 530, complementary-filtered localizer deviation 503 is latched 532 as an initial condition for integration 534 of inertial cross-runway velocity 318. Aircraft altitude from radar altimeter 418 is compared 536 to altitude threshold 530, e.g., 200 feet, to trigger latch 532.

Inertial cross-runway velocity block 506 computes inertial cross-runway velocity 318 as a function of an adjusted runway heading 538, ground speed 310, and track 312. Inertial cross-runway velocity 318 is a projection of ground speed 310 along track 312 onto a cross-runway vector; computed as ground speed 310 multiplied 540 by the sine 542 of the difference 544 between track 312 and adjusted runway heading 538. Inertial cross-runway velocity block 506 is further characterized by, but not limited to, the following equation, where $V_{CR}$ is cross-runway velocity 318 as a function of time, t, $S_{GND}$ is ground speed 310 as a function of time, t, T is track 312 as a function of time, t, and $H_{run,adj}$ is adjusted runway heading 538 as a function of time, t, and expressed in radians.

$$V_{CR}(t) = S_{GND}(t) \times \sin(T(t) - H_{run,adj}(t)) \qquad \text{EQ. 2}$$

Runway heading correction block 504 computes adjusted runway heading 538 to correct for errors in magnetic runway heading 308 available on aircraft 102. Adjusted runway heading 538 represents actual runway azimuth relative to North for use in inertial cross-runway velocity block 506 and translation-to-GCP block 508. Adjusted runway heading 538 is computed as a function of magnetic runway heading 308, ground speed 310, track 312, and localizer deviation rate 526 from complementary filter 502. Localizer deviation rate 526 is derived from EQ. 1, above, and is a component of complementary-filtered localizer deviation 503. Localizer deviation rate 526 is a derivative of complementary-filtered localizer deviation 503, i.e., $S \times D_{CF}$, and is represented by the following equation, where $D_{rate}$ is localizer deviation rate 526 as a function of time, t, and expressed in radians per second.

$$D_{rate} = \left[ \frac{K_1 S^2 + K_2 S^2 + K_3 S}{S^3 + K_1 S^2 + K_2 S + K_3} \right] \times$$
$$D_{set} + \left[ \frac{S^2}{S^3 + K_1 S^2 + K_2 S + K_3} \right] \times A_{CR} \qquad \text{EQ. 3}$$

In runway heading correction block 504, localizer deviation rate 526 is divided 546 by ground speed 310 and subtracted 548, along with magnetic runway heading 308, from track 312. The result of subtraction 548 is lag-filtered 550, i.e., low-pass filtered, with a time constant, τ. The result of lag-filtering 550 is added 552 to magnetic runway heading 308 to generate adjusted runway heading 538. Runway heading correction block 504 is further characterized, but not limited to, the following equation, where $H_{run}$ is magnetic runway heading 308 and is expressed in radians.

$$H_{run,adj} = \frac{\tau S}{\tau S + 1} \times H_{run} + \frac{1}{\tau S + 1} \times T - \frac{1}{\tau S + 1} \times \frac{D_{rate}}{S_{GND}} \qquad \text{EQ. 4}$$

Integration 534 integrates cross-runway velocity 318 from an initial condition at altitude threshold 530, which is latched at complementary-filtered localizer deviation 503 with respect to GCP 302. Integration 534 produces an inertial localizer deviation 535 with respect to IRU 304. A compensation 554 is added 556 to inertial localizer deviation 535 to correct for the difference between inertial localizer deviation 535 at IRU 304 and inertial localizer deviation 535 at GCP 302. For example, GCP 302, at the nose of aircraft 102, is at a different cross-runway position than IRU 304 during "crabbed" approaches for cross-wind landings. Compensation 554 accounts for changes in aircraft heading 314 that occur below altitude threshold 530, because integration 534 is initialized, at altitude threshold 530, to complimentary-filtered localizer deviation 503, which is computed with respect to GCP 302.

Translation-to-GCP block 508 computes compensation 554 as a function of aircraft heading 314, adjusted runway heading 538, and distance 306 along the fuselage of aircraft 102 between IRU 304 and GCP 302. Distance 306 is multiplied 558 by the sine 560 of a difference 562 between aircraft heading 314 and adjusted runway heading 538, yielding compensation 554 as a function of time, t. When aircraft 102 descends to altitude threshold 530, a hold value 564 of compensation 554 is latched 532. Hold value 564 represents the portion of compensation 554 already incorporated into inertial localizer deviation 535 via the initial condition of complementary-filtered localizer deviation 503 latched 532 at altitude threshold 530. Hold value 564 is subtracted 566 from compensation 554 to capture only the changes in aircraft heading 314 that occur below altitude threshold 530. Translation-to-GCP block 508 is further characterized, but not limited to, the following equation, where C is compensation 554 as a function of time, t, $L_{IRU-GCP}$ is distance 306 along the fuselage of aircraft 102 between IRU 304 and GCP 302, $H_{ac}$ is aircraft heading 314 as a function of time, t, and $t_{200}$ is the time at which aircraft 102 descends to altitude threshold 530.

$$C(t) = L_{IRU-GCP}[\sin(H_{ac}(t) - H_{run,adj}(t)) - \sin(H_{ac}(t_{200}) - H_{run,adj}(t_{200}))] \qquad \text{EQ. 5}$$

Figure 6:
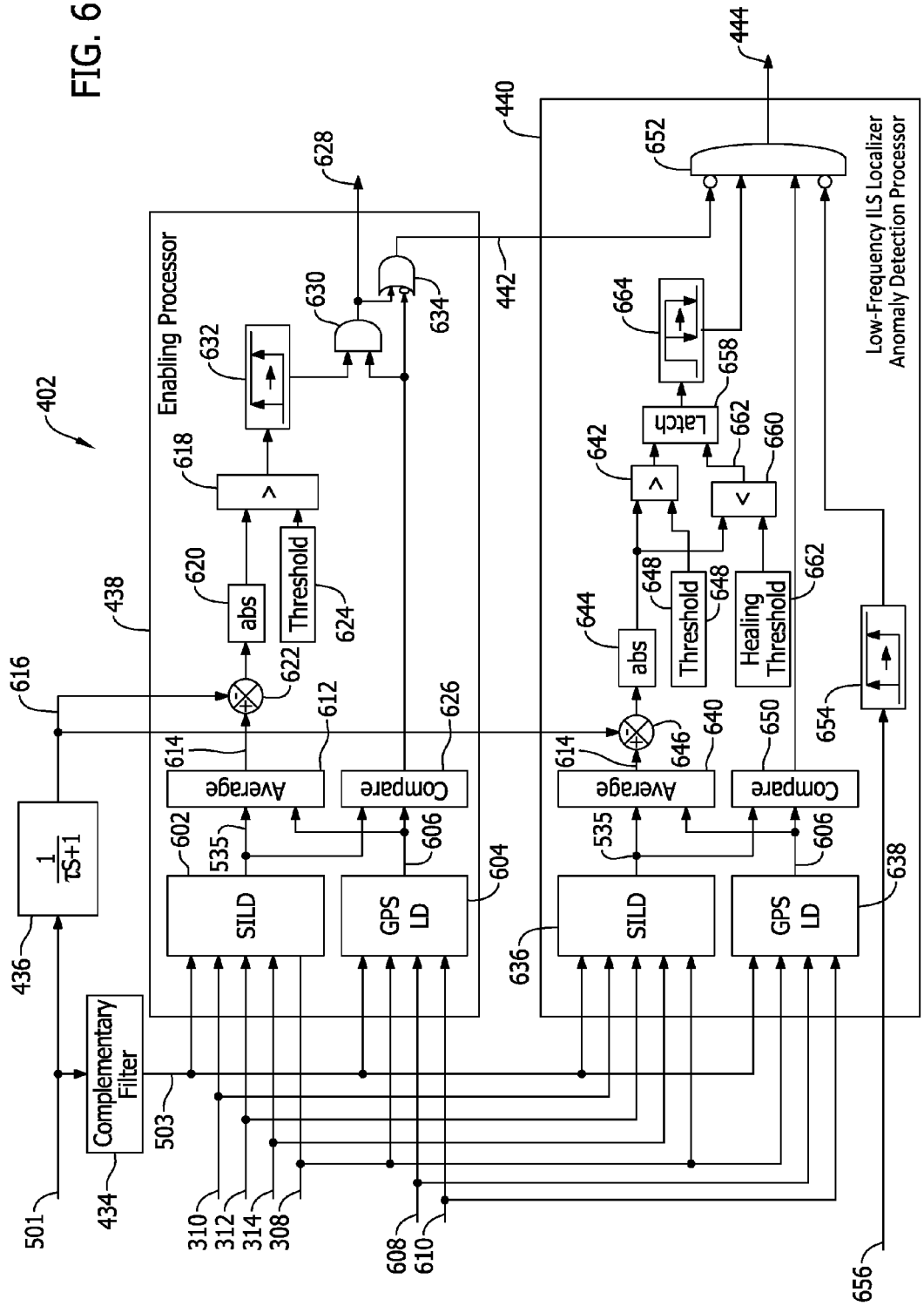
FIG. 6 is a functional block diagram of another exemplary flight control module for use in the flight control system shown in FIG. 4.

FIG. 6 is a functional block diagram of flight control module 402 for use in flight control system 400 shown in FIG. 4. Flight control module 402 includes enabling processor 438 and low-frequency ILS localizer anomaly detection processor 440. Low-frequency ILS localizer anomaly detection processor 440 detects anomalies once aircraft has descended below a low approach altitude threshold, for example, 200 feet. Enabling processor 438 is operable when aircraft has descended below a high approach altitude threshold and either enables or disables low-frequency ILS localizer anomaly detection processor 440 based on anomaly detection between the low approach altitude threshold and the high approach altitude threshold. In one embodiment, for example, the low approach altitude threshold is 200 feet and the high approach altitude threshold is 600 feet. In certain embodiments, enabling processor is operable between the high approach altitude threshold and just below the low approach altitude threshold. For example, where the low approach altitude threshold is 200 feet and the high approach altitude threshold is 600 feet, enabling processor 438 is operable from 600 feet to 190 feet.

Enabling processor 438 includes a SILD processor 602, such as SILD processor 500 shown in FIG. 5, and a GPS localizer deviation processor 604. SILD processor 602 computes inertial localizer deviation 535 as a function of complementary-filtered localizer deviation 503, ground speed 310, track 312, aircraft heading 314, and runway heading 308. GPS localizer deviation processor 604 computes a GPS localizer deviation 606 as a function of runway heading 308, complementary-filtered localizer deviation 503, and GPS position 432, shown in FIG. 4. GPS position 432 is represented by a GPS latitude 608 and a GPS longitude 610. SILD processor 602 and GPS localizer deviation processor 604 are initialized when aircraft 102 descends to the high approach altitude threshold to the value of complementary-filtered localizer deviation 503 at the high approach altitude. For example, SILD processor 602 and GPS localizer deviation processor 604 are initialized to the value of complementary-filtered localizer deviation 503 when aircraft 102 reaches 600 feet altitude above ground level.

Enabling processor 438 includes an average module 612 that computes an average localizer deviation 614 as an average of inertial localizer deviation 535 and GPS localizer deviation 606. Average localizer deviation 614 is compared to a lag-filtered localizer deviation 616 to detect low-frequency ILS localizer anomalies. Lag-filtered localizer deviation 616 is a product of passing ILS localizer deviation 501 through lag filter 436. Enabling processor 438 compares 618 an absolute value, or magnitude 620, of a difference 622 between lag-filtered localizer deviation 616 and average localizer deviation 614 to a threshold 624. Generally, if magnitude 620 exceeds threshold 624, enabling processor 438 declares an anomaly. Threshold 624 is generally in the range of 25 to 100 feet. For example, in one embodiment, threshold 624 is 50 feet. Enabling processor 438 utilizes lag filter 436 to smooth ILS localizer deviation 501 rather than complementary filter 434, because complementary filter 434 blends inertial data with ILS localizer deviation 501 and would slow divergence of the ILS localizer deviation 501, and further would impede detection of low-frequency anomalies.

Enabling processor 438 includes a comparator 626 that compares inertial localizer deviation 535 and GPS localizer deviation 606. Comparator 626 checks that inertial localizer deviation 535 and GPS localizer deviation 606 agree within a threshold. If inertial localizer deviation 535 and GPS localizer deviation 606 disagree enough, enabling processor 438 disables low-frequency ILS localizer anomaly detection processor 440 via disable signal 442.

Enabling processor 438 includes various logic to generate disable signal 442 and an anomaly detected signal 628. Anomaly detected signal 628 is logically true when inertial localizer deviation 535 and GPS localizer deviation 606 agree within the threshold, as determined by comparator 626, and when comparison 618 of difference 622 to threshold 624 is true. Anomaly detected signal 628 is generated by an and-gate 630. Enabling processor 438 includes a time delay 632 to ensure difference 622 between lag-filtered localizer deviation 616 and average localizer deviation 614 exceeds threshold 624 for at least a minimum duration of time before declaring an anomaly. Enabling processor 438 includes an or-gate 634 to control disabling signal 442. Disabling signal 442 is logically true when an anomaly is detected, as indicated by anomaly detected signal 628, or when comparator 626 indicates inertial localizer deviation 535 and GPS localizer deviation 606 disagree.

Low-frequency ILS localizer anomaly detection processor 440 includes a SILD processor 636, such as SILD processor 500 shown in FIG. 5, and a GPS localizer deviation processor 638. SILD processor 636 computes inertial localizer deviation 535 as a function of complementary-filtered localizer deviation 503, ground speed 310, track 312, aircraft heading 314, and runway heading 308. GPS localizer deviation processor 604 computes GPS localizer deviation 606 as a function of runway heading 308, complementary-filtered localizer deviation 503, and GPS position 432, shown in FIG. 4. GPS position 432 is represented by a GPS latitude 608 and a GPS longitude 610. SILD processor 636 and GPS localizer deviation processor 638 are initialized when aircraft 102 descends to the low approach altitude threshold to the value of complementary-filtered localizer deviation 503 at the low approach altitude. For example, SILD processor 636 and GPS localizer deviation processor 638 are initialized to the value of complementary-filtered localizer deviation 503 when aircraft 102 reaches 200 feet altitude above ground level.

Low-frequency ILS localizer anomaly detection processor 440 includes an average module 640 that computes average localizer deviation 614 as an average of inertial localizer deviation 535 and GPS localizer deviation 606. Average localizer deviation 614 is compared to lag-filtered localizer deviation 616 to detect low-frequency ILS localizer anomalies. Low-frequency ILS localizer anomaly detection processor 440 compares 642 an absolute value 644 of a difference 646 between lag-filtered localizer deviation 616 and average localizer deviation 614 to a threshold 648. Generally, if difference 646 exceeds threshold 648, Low-frequency ILS localizer anomaly detection processor 440 declares an anomaly. Threshold 648 is generally in the range of 1 to 50 feet. For example, in one embodiment, threshold 648 is 25 feet. Low-frequency ILS localizer anomaly detection processor 440, as in enabling processor 438, utilizes lag filter 436 to smooth ILS localizer deviation 501 rather than complementary filter 434.

Low-frequency ILS localizer anomaly detection processor 440 includes a comparator 650 that compares inertial localizer deviation 535 and GPS localizer deviation 606. Comparator 650 checks that inertial localizer deviation 535 and GPS localizer deviation 606 agree within a threshold. If inertial localizer deviation 535 and GPS localizer deviation 606 disagree enough, low-frequency ILS localizer anomaly detection processor 440 cannot use comparison 642 to detect low-frequency ILS localizer anomalies.

Low-frequency ILS localizer anomaly detection processor 440 includes an and-gate 652 to enforce several necessary conditions for detection of low-frequency ILS localizer anomalies. The first condition is that disable signal 442 is false, generally indicating that enabling processor 438 has not disabled low-frequency ILS localizer anomaly detection processor 440. More specifically, disabling signal 442 should indicate enabling processor 438 has not detected a low-frequency ILS localizer anomaly in its operative range of altitudes, i.e., between a high approach altitude threshold and a low approach altitude threshold, e.g., below 600 feet and above 200 feet. The second condition is that comparator 650 indicates inertial localizer deviation 535 and GPS localizer deviation 606 agree within the appropriate threshold.

A third condition is that aircraft 102 has not completed performance of landing and rollout. Low-frequency ILS localizer anomaly detection processor 440 includes a time delay 654 that is triggered when aircraft 102 touches down. Touch down of aircraft 102 is indicated by a touch down signal 656 that is received, for example, through communication interface 415 and communication bus 414. Touch down signal 656 indicates touch down of aircraft 102, for example, by a logic-high signal. Time delay 654 ensures low-frequency ILS localizer anomaly detection processor 440 remains enabled for a predetermined duration after touch down and during rollout. When the predetermined duration elapses, time delay 654 negates the third condition for detection of low-frequency ILS localizer anomalies.

Given that (1) low-frequency ILS localizer anomaly detection processor 440 is not disabled by enabling processor 438, (2) inertial localizer deviation 535 and GPS localizer deviation 606 agree, and (3) aircraft 102 has not completed landing and rollout, low-frequency ILS localizer anomaly detection processor 440 is free to carry out anomaly detection. When comparison 642 detects an anomaly, the detection is latched 658 and anomaly detected signal 444 indicates a low-frequency ILS localizer anomaly has been detected. In response, flight control module 402 may carry out one or more remedial steps. In certain embodiments, flight control module 402 transitions control of aircraft 102, by automated landing system 428, from ILS localizer-based control, i.e., based on complementary-filtered localizer deviation 503, to inertial localizer-based control, i.e., based on inertial localizer deviation 535. In certain embodiments, flight control module 402 may transmit an indicator signal to a pilot interface system (not shown) to notify a pilot of aircraft 102 of the detected anomaly. In such embodiments, control of aircraft 102 may ultimately be transitioned from automated landing system 428 to the pilot. The pilot interface system may relay anomaly detected signal 444 to the pilot using one or more of visual indicators and aural indicators.

Generally, low-frequency ILS localizer anomalies are temporary, presenting and resolving themselves within the time frame of the approach by aircraft 102. Low-frequency ILS localizer anomaly detection processor 440 includes the ability to recover from the detected low-frequency ILS localizer anomaly through a "healing" procedure. Low-frequency ILS localizer anomaly detection processor 440 includes a comparison 660 of the difference 646 between average localizer deviation 614 and lag-filtered ILS localizer 616 to a healing threshold 662. When a low-frequency ILS localizer anomaly is latched 658, the anomaly can be reset 662 if difference 646 falls below healing threshold 662. Low-frequency ILS localizer anomaly detection processor 440 includes a time delay 664 to ensure difference 646 remains below healing threshold 662 for a predetermined duration before negating anomaly detected signal 444. Healing threshold 662 is generally in the range of 1 to 50 feet, and is typically less than threshold 648 for initially declaring the low-frequency ILS localizer anomaly. For example, difference 646 must rise above threshold 648, e.g., 25 feet, to declare the low-frequency ILS localizer anomaly, and difference 646 must fall below healing threshold 662, e.g., 15 feet, to negate that low-frequency ILS localizer anomaly. Moreover, difference 646 must fall below healing threshold 662 for the predetermined duration defined by time delay 664 before negating the low-frequency ILS localizer anomaly.

Figure 7:
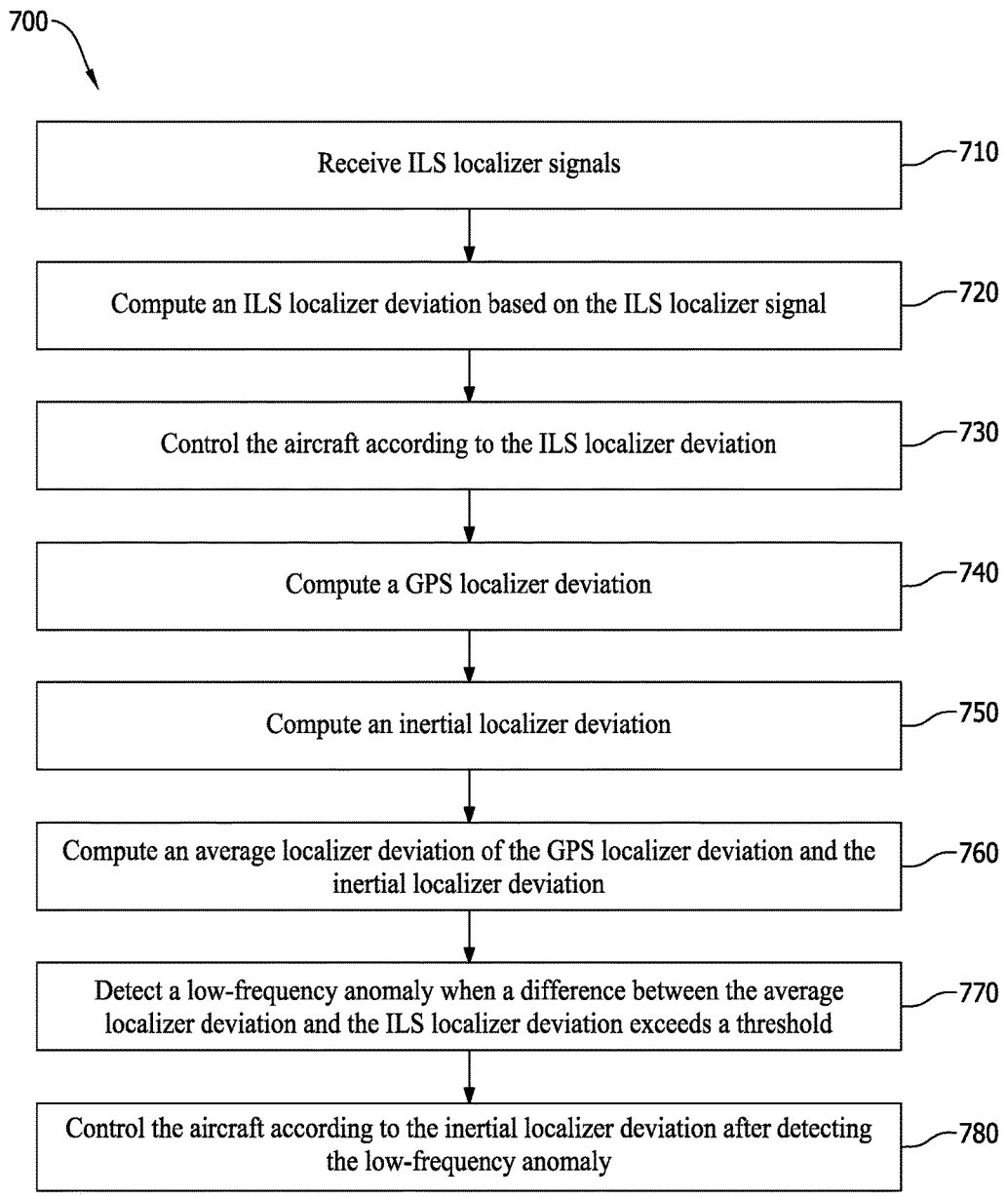
FIG. 7 is a flow diagram of an exemplary method of detecting a low-frequency anomaly in an ILS localizer signal received by an aircraft during landing.

FIG. 7 is a flow diagram of a method 700 of detecting a low-frequency anomaly in an ILS localizer signal received by aircraft 102 during landing. Method 700 may be embodied in or carried out by flight control system 400 and flight control module 402, shown in FIG. 4. Method 700 begins when an ILS localizer signal is received 710 by aircraft 102. Aircraft 102 routes the ILS localizer signal to left MMR 420 and right MMR 422, which compute 720 ILS localizer deviations, i.e., left MMR localizer deviation 424 and right MMR localizer deviation 426, based on the received ILS localizer signal. Flight control module 402 selects complementary-filtered localizer deviation 503 for use in controlling 730 aircraft 102 using automated landing system 428 during landing.

Flight control module 402 and, more specifically, low-frequency ILS localizer anomaly detection processor 440 and GPS localizer deviation processor 638 compute 740 GPS localizer deviation 606 based on GPS position 432 of aircraft 102 with respect to runway centerline 106. Flight control module 402 and, more specifically, low-frequency ILS localizer anomaly detection processor 440 and SILD processor 636 compute 750 inertial localizer deviation 535 based on inertial data from IRU 304. In alternative embodiments, GPS localizer deviation processor 638 and SILD processor 636 are embodied in another device other that flight control module 402, where automated landing system 428 resides. For example, in one embodiment, low-frequency ILS localizer anomaly detection processor 440 is embodied in left MMR 420, right MMR 422, or both. Similarly, enabling processor 438 may be embodied in left MMR 420, right MMR 422, or both, for example.

Low-frequency ILS localizer anomaly detection processor 440 averages 760 GPS localizer deviation 606 and inertial localizer deviation 535 for comparison 642 to lag-filtered localizer deviation 616. A low-frequency anomaly is detected 770 when difference 646 between lag-filtered localizer deviation 616 and average localizer deviation 614 exceeds threshold 648. When the low-frequency anomaly is detected, control of aircraft 102 is transitioned from being ILS localizer-based to inertial localizer-based. Aircraft 102 is then controlled 780 according to inertial localizer deviation 535 until manual control of aircraft 102 is assumed by a pilot.

In certain embodiments, method 700 includes transmitting an indicator, based on anomaly detected signal 628 and/or anomaly detected signal 444 to a pilot interface system, the indicator indicative of detection of the low-frequency anomaly. The pilot interface system may, in certain embodiments, relay the indicator to a pilot in the form of a visual indicator, an aural indicator, or both.

In certain embodiments, computing 750 inertial localizer deviation 535 includes initializing inertial localizer deviation 535 to complementary-filtered localizer deviation 503 when aircraft 102 descends below a low approach altitude threshold, e.g., 200 feet. Computing 750, in such embodiments, further includes integrating inertial data, such as, for example, ground speed 310, track angle 312, cross-runway acceleration 416, and aircraft heading 314 on communication bus 414.

In certain embodiments, method 700 includes initializing SILD processor 602 to complementary-filtered localizer deviation 503 when aircraft 102 descends below a high approach altitude threshold, e.g., 600 feet. In such embodiments, method 700 includes initializing GPS localizer deviation processor 604 to complementary-filtered localizer deviation 503 when aircraft 102 descends below the high approach altitude threshold. In such embodiments, method 700 further includes detecting, by enabling processor 438, an earlier low-frequency anomaly based on variances between lag-filtered localizer deviation 616 and average localizer deviation 614, which is averaged 612 based on inertial localizer deviation 535 and GPS localizer deviation 606. When the earlier low-frequency anomaly is detected, enabling processor 438 disables low-frequency ILS localizer anomaly detection processor 440 before aircraft 102 descends beneath the low approach altitude threshold.

In certain embodiments, method 700 includes computing a difference between GPS localizer deviation 606 and inertial localizer deviation 535, and disabling detection of the low-frequency anomaly when the difference exceeds a threshold. Such embodiments carry out the comparison in comparator 626 and/or comparator 650.

The above described embodiments of flight control systems for use by an aircraft during landing provide low-frequency ILS localizer anomaly detection. More specifically, embodiments described herein provide a flight control module that utilizes a combination of an inertial localizer deviation and a GPS localizer deviation to compare with an ILS localizer deviation to detect low-frequency anomalies. For example, if the ILS localizer deviation differs from an average of the GPS localizer deviation and the inertial localizer deviation, an anomaly is detected. Embodiments described herein further provide a monitoring function by an enabling processor that detects low-frequency anomalies below a high approach altitude threshold, e.g., 600 feet down to below a low approach altitude threshold, e.g., 190 feet. When a low-frequency anomaly is detected by the enabling processor, detection below the low approach altitude threshold, e.g., 200 feet, is disabled to prevent synchronization of the computations to the anomaly itself rather than to the actual distance from runway centerline. Detection of low-frequency anomalies below the low approach altitude threshold is carried out similarly to the monitoring from 600 feet to 190 feet, and generates an anomaly detected signal that can be used to transition control of the aircraft from ILS localizer-based to inertial localizer-based. Further, embodiments described herein provide visual indicators, aural indicators, or both to a pilot of the aircraft to alert them of the low-frequency anomaly such that the landing can be performed manually.

Exemplary embodiments of methods, systems, and apparatus for flight control systems are not limited to the specific embodiments described herein, but rather, components of systems and/or steps of the methods may be utilized independently and separately from other components and/or steps described herein. For example, the methods may also be used in combination with other non-conventional flight control systems, and are not limited to practice with only the systems and methods as described herein. Rather, the exemplary embodiment can be implemented and utilized in connection with many other applications, equipment, and systems that may benefit from increased efficiency, reduced operational cost, and reduced capital expenditure.

An exemplary technical effect of the methods, systems, and apparatus described herein includes at least one of: (a) detecting low-frequency ILS localizer anomalies during landing of an aircraft; (b) transitioning from ILS localizer deviation-based control of the aircraft during an automated landing to a SILD-based control of the aircraft when low-frequency ILS localizer anomalies are detected; (c) improving availability of automated landing systems through low-frequency ILS localizer anomaly detection; (d) reducing false positive detection of low-frequency ILS localizer anomalies through verification of SILD data with GPS localizer deviation data; (e) improving localizer guidance below 200 feet through monitoring ILS localizer signals for low-frequency anomalies from 600 to below 200 feet; and (f) providing an indicator of detected low-frequency ILS localizer anomalies via one or more visual or aural indicators.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the terms processor, processing device, and controller.

In the embodiments described herein, memory may include, but is not limited to, a computer-readable medium, such as a random access memory (RAM), and a computer-readable non-volatile medium, such as flash memory. Alternatively, a floppy disk, a compact disc—read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

This written description uses examples to disclose various embodiments, which include the best mode, to enable any person skilled in the art to practice those embodiments, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A flight control module for detecting anomalies in instrument landing system (ILS) localizer signals during landing of an aircraft, comprising:
   a communication interface configured to receive inertial data for said aircraft, global positioning system (GPS) data for said aircraft, and an ILS localizer deviation; and
   a processor coupled to said communication interface and configured to:
      compute an inertial localizer deviation based on the inertial data,
      compute a GPS localizer deviation based on the GPS data,
      compare the ILS localizer deviation to an average of the inertial localizer deviation and the GPS localizer deviation to detect a low-frequency anomaly in the ILS localizer deviation, and
      initiate a transition from controlling said aircraft based on the ILS localizer deviation to controlling said aircraft based on the inertial localizer deviation when the low-frequency anomaly is detected.

2. The flight control module of claim 1, wherein said communication interface is further coupled to a radar altimeter configured to measure altitude of said aircraft above ground level, and wherein said processor is further configured to initialize computation of the inertial localizer deviation and the GPS localizer deviation to the ILS localizer deviation when said aircraft descends beneath a low approach altitude threshold.

3. The flight control module of claim 2, wherein said processor is further configured to:
   initialize a second computation of the inertial localizer deviation and the GPS localizer deviation when said aircraft descends beneath a high approach altitude threshold;
   compare the second computations to the ILS localizer deviation to detect an earlier low-frequency anomaly when said aircraft is located between the high approach altitude threshold and the low approach altitude threshold; and
   disable detection of the low-frequency anomaly below the low approach altitude threshold when the earlier low-frequency anomaly is detected between the high approach altitude threshold and the low approach altitude threshold.

4. The flight control module of claim 3, wherein the low approach altitude threshold is 200 feet and the high approach altitude threshold is 600 feet.

5. The flight control module of claim 1, wherein said processor is further configured to:

compare the inertial localizer deviation to the GPS localizer deviation; and disable detection of the low-frequency anomaly when a difference between the inertial localizer deviation and the GPS localizer deviation exceeds a threshold.

6. The flight control module of claim 1, wherein the processor is further configured to:
compute the average of the inertial localizer deviation and the GPS localizer deviation;
compute an absolute value difference between the average and the ILS localizer deviation; and
latch an anomaly indicator when the absolute value difference exceeds a trip threshold.

7. The flight control module of claim 6, wherein the processor is further configured to reset said anomaly indicator after the absolute value difference falls below a healing threshold for a healing duration.

8. The flight control module of claim 1, wherein the processor is further configured to initiate an indication to a pilot of said aircraft that the low-frequency anomaly has been detected.

9. A flight control system for landing an aircraft, said flight control system comprising:
a communication bus;
a global positioning system (GPS) coupled to said communication bus and configured to transmit a GPS position of said aircraft onto said communication bus;
a multi-mode receiver (MMR) coupled to said communication bus and configured to transmit an instrument landing system (ILS) localizer deviation onto said communication bus, the ILS localizer deviation generated according to received ILS localizer signals;
a flight control module comprising a processor coupled to said communication bus and configured to:
receive inertial data for said aircraft, the GPS position, and the ILS localizer deviation on said communication bus,
compute a GPS localizer deviation and an inertial localizer deviation, and
detect a low-frequency anomaly in the received ILS localizer signals based on variances in the ILS localizer deviation relative to an average localizer deviation computed for the GPS localizer deviation and the inertial localizer deviation; and
an automated landing system configured to transition from controlling said aircraft based on the ILS localizer deviation to controlling said aircraft based on the inertial localizer deviation when the low-frequency anomaly is detected.

10. The flight control system of claim 9, wherein said flight control module is further configured to transmit an indicator to a pilot interface system, the indicator indicative of detection of the low-frequency anomaly.

11. The flight control system of claim 10, wherein said pilot interface system is configured to present a visual indicator to a pilot in response to the indicator received from said flight control module.

12. The flight control system of claim 10, wherein said pilot interface system is configured to present an aural indicator to a pilot in response to the indicator received from said flight control module.

13. The flight control system of claim 9, wherein said flight control module is further configured to:
enable detection of the low-frequency anomaly when said aircraft descends below a low approach altitude threshold; and
disable detection of the low-frequency anomaly below the low approach altitude threshold when the low-frequency anomaly is otherwise detected above the low approach altitude threshold.

14. The flight control system of claim 9, wherein said flight control module is further configured to disable detection of the low-frequency anomaly when a difference between the GPS localizer deviation and the inertial localizer deviation exceeds a threshold.

15. The flight control system of claim 9, wherein said flight control module is further configured to disable detection of the low-frequency anomaly after a rollout duration beginning when said aircraft touches down.

16. The flight control system of claim 9, wherein said flight control module is further configured to:
initiate computation of the GPS localizer deviation and the inertial localizer deviation based on a complementary-filtered ILS localizer deviation; and
compare the average localizer deviation to a lag-filtered ILS localizer deviation to detect the low-frequency anomaly.

17. The flight control system of claim 9, wherein said flight control module is further configured to receive inertial data including ground speed, track angle, cross-runway acceleration, and aircraft heading on said communication bus.

18. A method of detecting a low-frequency anomaly in an instrument landing system (ILS) localizer signal received by an aircraft during landing, said method comprising:
receiving, at a multi-mode receiver (MMR), an instrument landing system (ILS) localizer signal;
computing, by the MMR, a ILS localizer deviation based on the ILS localizer signal;
controlling, by an automated landing system, the aircraft according to the ILS localizer deviation;
computing, by a flight control module, a global position system (GPS) localizer deviation;
computing, by the flight control module, an inertial localizer deviation;
computing, by the flight control module, an average localizer deviation of the GPS localizer deviation and the inertial localizer deviation;
detecting, by the flight control module, the low-frequency anomaly when a difference between the average localizer deviation and the ILS localizer deviation exceeds a threshold; and
controlling, by the automated landing system, the aircraft according to the inertial localizer deviation after detecting the low-frequency anomaly.

19. The method of claim 18, wherein computing the inertial localizer deviation comprises:
initializing the inertial localizer deviation to the ILS localizer deviation when the aircraft descends below a low approach altitude threshold; and
integrating inertial data for the aircraft to continuously update the inertial localizer deviation below the low approach altitude threshold and through rollout.

20. The method of claim 19 further comprising:
initializing, by the flight control module, a second inertial localizer deviation to the ILS localizer deviation when the aircraft descends below a high approach altitude threshold;
initializing, by the flight control module, a second GPS localizer deviation to the ILS localizer deviation when the aircraft descends below the high approach altitude threshold;

detecting, by the flight control module, an earlier low-frequency anomaly based on variances between the ILS localizer deviation and a second average localizer deviation of the second inertial localizer deviation and the second GPS localizer deviation; and disabling, by the flight control module, detection of the low-frequency anomaly before the aircraft descends beneath the low approach altitude threshold.

21. The method of claim 18 further comprising complementary-filtering the ILS localizer deviation for initializing the inertial localizer deviation and for controlling the aircraft.

22. The method of claim 18 further comprising:

computing, by the flight control module, a difference between the GPS localizer deviation and the inertial localizer deviation; and disabling, by the flight control module, detection of the low-frequency anomaly when the difference exceeds a threshold.

23. The method of claim 18 further comprising:

lag-filtering, by the flight control module, the ILS localizer deviation; and computing, by the flight control module, a difference between the average localizer deviation and the lag-filtered ILS localizer deviation for detection of the low-frequency anomaly.

24. The method of claim 18 further comprising transmitting, by the flight control module, an indicator to a pilot interface system, the indicator indicative of detection of the low-frequency anomaly.

* * * * *